US006779439B2

(12) United States Patent
Lee et al.

(10) Patent No.: US 6,779,439 B2
(45) Date of Patent: Aug. 24, 2004

(54) BREAD MAKER

(75) Inventors: Jong-wook Lee, Yongin (KR); Tae-uk Lee, Suwon (KR); Han-jun Sung, Suwon (KR); Jae-ryong Park, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/459,536

(22) Filed: Jun. 12, 2003

(65) Prior Publication Data

US 2004/0011215 A1 Jan. 22, 2004

(30) Foreign Application Priority Data

Jul. 20, 2002 (KR) ........................................ 2002-42768

(51) Int. Cl.[7] ............................ A23L 1/00; A47J 27/62; A47J 37/01; A21C 1/08
(52) U.S. Cl. ............................... 99/348; 99/353; 99/426
(58) Field of Search ........................... 99/325–331, 341, 99/342, 348, 352–355, 426, 343, 449; 366/69, 130, 143, 144–146, 149, 219, 240, 341, 349, 602; 222/94, 98, 100–102; 206/219, 221; 383/38; 426/128, 232, 233, 392, 394, 87, 112, 113, 405, 120, 124, 512, 523

(56) References Cited

U.S. PATENT DOCUMENTS

| 4,550,653 A | * | 11/1985 | Hedenberg | .................. 99/348 |
| 4,550,654 A | * | 11/1985 | Hedenberg | .................. 99/348 |
| 4,590,850 A | | 5/1986 | Hedenberg | |
| 4,803,086 A | | 2/1989 | Hedenberg | |
| 5,146,840 A | | 9/1992 | Hedenberg | |
| 5,947,009 A | * | 9/1999 | Hedenberg | .................. 99/348 |

FOREIGN PATENT DOCUMENTS

| JP | 4-242490 | 8/1992 |
| JP | 5-59551 | 8/1993 |
| KR | 1988-700638 | 4/1988 |
| KR | 2002-56626 | 7/2002 |
| WO | WO 86/03931 | 7/1986 |
| WO | WO87/03784 | 7/1987 |
| WO | WO99/25467 | 5/1999 |

OTHER PUBLICATIONS

EPO Search Report for corresponding Application No. EP 02258499 dated Nov. 10, 2003.

* cited by examiner

*Primary Examiner*—Timothy F. Simone
(74) *Attorney, Agent, or Firm*—Staas & Halsey LLP

(57) ABSTRACT

A bread maker having a main body forming an oven compartment, a door, a pair of parallel kneading drums, a barcode reader to read a barcode printed on a mixing bag and a reader holder. The reader holder includes a holder body, a sensing lever adjacent to a kneading drum with one end connected to one end of the holder body and the other end protruding from the main body towards the door, the sensing lever being pushed back by the door when the door is closed, and a reader supporting part extending from the holder body towards the door and supporting the barcode reader. The barcode reader moves into a reading position near the adjacent kneading drum when the door is opened and moves into a releasing position distant from the adjacent kneading drum when the door is closed.

22 Claims, 8 Drawing Sheets

BREAD MAKER

CROSS-REFERENCE TO RELATED APPLICATIONS

This application claims the benefit of Korean Application No. 2002-42768, filed Jul. 20, 2002, in the Korean Intellectual Property Office, the disclosure of which is incorporated herein by reference.

BACKGROUND OF THE INVENTION

1. Field of the Invention

The present invention relates to a bread maker having a barcode reader.

2. Description of the Related Art

Generally, a bread maker automatically performs kneading, leavening and baking of dough, and provides fresh bread to a user, so that the user just places raw materials (ingredients) in the bread maker. Various bread makers have been developed.

For example, as shown in FIG. 5, a bread maker disclosed in Korean Patent Application No. 2000-86022 includes a main body 100 divided into an oven compartment 102 and a component compartment 106 accommodating a plurality of electric components, a door 103 opening and closing the oven compartment 102, rotatable knobs 105 in the front of the component compartment 106 allowing a user to control the bread maker, and a display panel 107 displaying an operating state of the bread maker. On a rear wall of the oven compartment 102 and inside the door 103 are heaters 112 for heating the inside of the oven compartment 102. Inside the oven compartment 102 is a baking tray 109 for containing the dough therein.

Inside the oven compartment 102, upper and lower kneading drums 104 and 119 are provided in parallel, each having a plurality of projections 116 and 118 used to attach to opposite ends of a mixing bag (not shown) filled with raw materials for the bread.

Behind the upper kneading drum 104 is a barcode reader 120 protruding inwardly from the rear wall of the oven compartment 102 that reads a barcode printed on the mixing bag. The mixing bag connects to the projections 116 and 118 of the upper and lower kneading drums 104 and 119, and is wound on the upper and lower kneading drums 104 and 119. The barcode reader 120 is a pen type of barcode reader, and is moved across the barcode, thereby reading information represented by the barcode.

FIG. 6 is a perspective view of the barcode reader 120 in FIG. 5. As shown therein, the barcode reader 120 includes an optical sensor 121 scanning the barcode, and a sensor body 122 movably accommodating a part of the optical sensor 121 therein and supporting the optical sensor 121. Inside the sensor body 122 is a spring (not shown) elastically pushing the optical sensor 121 to contact the upper kneading drum 104.

The barcode reader 120 is supported by a reader supporting member 123 that includes a supporting lever 124 extending from the sensor body 122 to support the barcode reader 120, and a slider 125 that extends toward the door 103 and is perpendicularly coupled to the supporting lever 124. A spring support 127 is partially formed on a part of the slider 125, and a rear end of the slider 125 is slidingly coupled with a stopper 128. A compression spring 126 is placed on the slider 125 between the spring support 127 and the stopper 128 and is prevented from breaking away from the slider 125 by the spring support 127 and the stopper 128.

The stopper 128 is fastened to the rear wall of the oven compartment 102, so that the compression spring 126 provided between the spring support 127 and the stopper 128 elastically pushes the slider 125 toward the door 103.

At a front part of the component compartment 106 adjacent to the door 103 when closed, is a slider hole 130 through which the slider 125 of the barcode reader supporting member 123 passes. On the rear wall of the oven compartment 102 is a barcode reader hole (not shown). Inside the component compartment 106 is a slider guiding part (not shown) for guiding a sliding movement of the slider 125.

In the conventional bread maker, as the door 103 is opened and closed, the slider 125 forwardly and backwardly moves inside the component compartment 106, thereby moving the barcode reader 120. However, because the slider 125 is in contact with the slider hole 130 of the main body 100 and moves inside the component compartment 106, a complicated inner-structure of the component compartment 106 may interfere with the sliding movement of the slider 125. Further, because a part of the optical sensor 121 and the spring (not shown) inside the sensor body 122 are movably accommodated in the sensor body 122, the sensor body 122 may interfere with the contacting movement of the optical sensor 121, so that the barcode reader 120 cannot scan the barcode smoothly.

SUMMARY OF THE INVENTION

It is an object of the present invention to provide a bread maker in which a barcode reader can smoothly move across and scan a barcode.

Additional objects and advantages of the invention will be set forth in part in the description that follows, and, in part, will be obvious from the description, or may be learned by practice of the invention.

To achieve the above and other objects according to an embodiment of the present invention, there is provided a bread maker having a main body forming an oven compartment, a door opening and closing the oven compartment, a pair of parallel kneading drums inside the oven compartment on which opposite ends of a mixing bag filled with bread ingredients are respectively attached, a barcode reader to read a barcode printed on the mixing bag, a hinge supporting part attached to a rear wall of the oven compartment, and a reader holder inside the main body. The reader holder includes a holder body, a sensing lever adjacent to one of the kneading drums and having one end connected to one end of the holder body and the other end protruding from the main body towards the door, the sensing lever being pushed back by the door when the door is closed and moving towards a front of the main body when the door is opened, a hinge part at the other end of the holder body and rotatably connected to the hinge supporting part, and a reader supporting part extending from the holder body towards the door and supporting the barcode reader, wherein the barcode reader moves into a reading position near the adjacent kneading drum when the door is opened and moves into a releasing position distant from the adjacent kneading drum when the door is closed.

The bread maker further includes a spring member elastically pushing the reader holder toward the reading position.

The spring member is an extension spring having a first end, distant from the hinge supporting part, coupled to the reader holder, and a second end coupled to the hinge supporting part.

The hinge supporting part includes a hinge pin combined with the hinge part of the reader holder, and hinge arms rotatably supporting each end of the hinge pin.

To achieve the above and other objects according to another aspect of the present invention, there is provided a barcode reader holder for a bread maker having a main body forming an oven compartment, a door opening and closing the oven compartment, a pair of parallel kneading drums inside the oven compartment on which opposite ends of a mixing bag filled with bread ingredients are respectively attached, and a barcode reader to read a barcode printed on the mixing bag, including a holder body; a hinge supporting part attached to a rear wall of the oven compartment; a sensing lever adjacent to one of the kneading drums and having one end connected to one end of the holder body and the other end protruding from the main body towards the door, the sensing lever being pushed back by the door when the door is closed and moving towards a front of the main body when the door is opened; a hinge part combined with the other end of the holder body and rotatably connected to the hinge supporting part; and a reader supporting part extending from the holder body towards the door and supporting the barcode reader, wherein the barcode reader moves into a reading position near the adjacent kneading drum when the door is opened and moves into a releasing position distant from the adjacent kneading drum when the door is closed.

To achieve the above and other objects according to another aspect of the present invention, there is provided a barcode reader assembly for a bread maker having a main body forming an oven compartment, a door opening and closing the oven compartment, a pair of parallel kneading drums inside the oven compartment on which opposite ends of a mixing bag filled with bread ingredients are respectively attached, and a barcode reader to read a barcode printed on the mixing bag, including a holder body; a hinge supporting part attached to a rear wall of the oven compartment; a sensing lever adjacent to one of the kneading drums and having one end connected to one end of the holder body and the other end protruding from the main body towards the door, the sensing lever being pushed back by the door when the door is closed and moving towards a front of the main body when the door is opened; a hinge part combined with the other end of the holder body and rotatably connected to the hinge supporting part; a reader supporting part extending from the holder body towards the door and supporting the barcode reader; and an elastic member having a first end coupled to the reader holder and a second end coupled to the hinge supporting part, the elastic member elastically pushing the reader holder towards the adjacent kneading drum when the door is opened, wherein the barcode reader moves into a reading position near the adjacent kneading drum when the door is opened and moves into a releasing position distant from the adjacent kneading drum when the door is closed.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other objects and advantages of the present invention will become apparent and more readily appreciated from the following description of the embodiments, taken in conjunction with the accompany drawings, of which.

DETAILED DESCRIPTION OF THE PREFERRED EMBODIMENT

Figure 1:
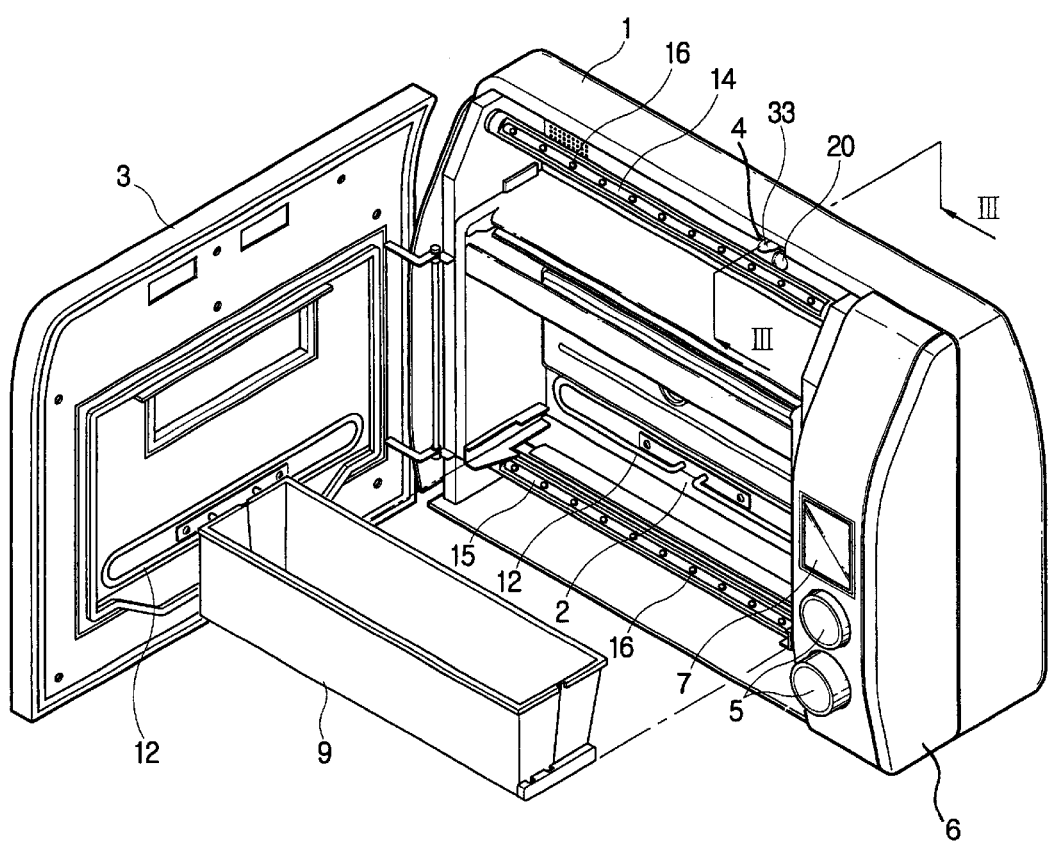
FIG. 1 is a perspective view of a bread maker according to an embodiment of the present invention.

Hereinafter, embodiments of the present invention will be described in detail with reference to the attached drawings, wherein the like reference numerals refer to the like elements throughout. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

FIG. 1 is a perspective view of a bread maker according to an embodiment of the present invention. As shown therein, a bread maker according to the present invention includes a main body 1 divided into an oven compartment 2 and a component compartment 6 accommodating a plurality of electric components, a door 3 opening and closing the oven compartment 2, rotatable knobs 5 in the front of the component compartment 6 allowing a user to control the bread maker, and a display panel 7 displaying an operating state of the bread maker. On a rear wall of the oven compartment 2 and inside the door 3 are heaters 12 for heating the inside of the oven compartment 2. Inside the oven compartment 2 is a baking tray 9 for containing the dough therein.

Figure 7:
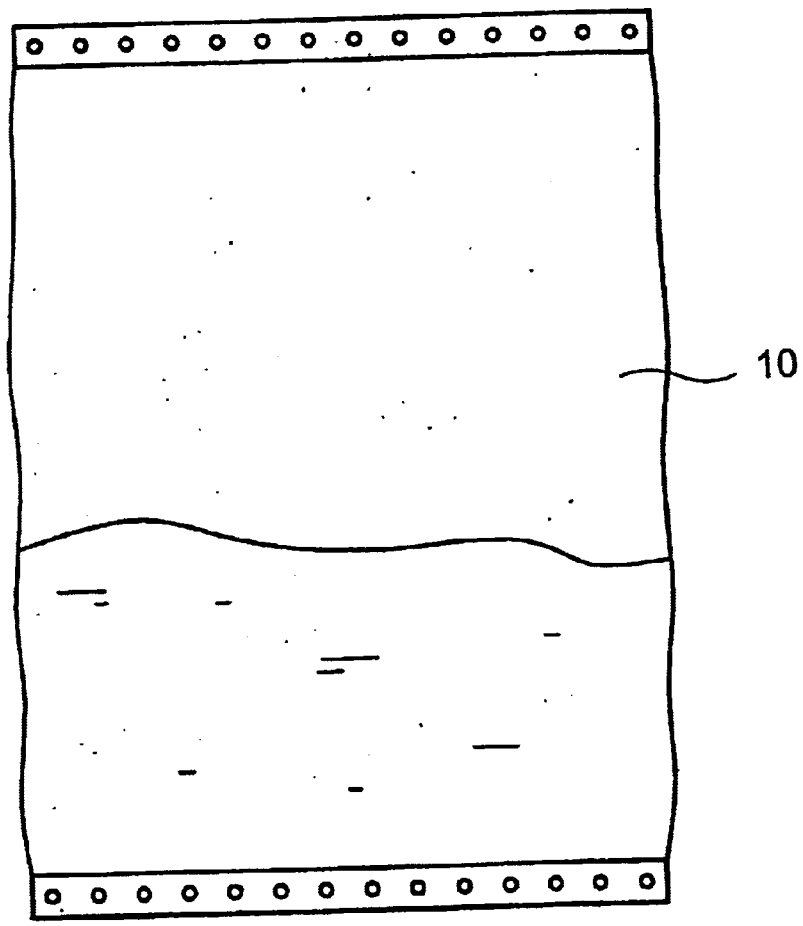
FIG. 7 is a perspective view of a mixing bag used in the bread maker according to the embodiment of the present invention.

Inside the oven compartment 2, upper and lower kneading drums 14 and 15 are provided in parallel, each having a plurality of projections 16 used to attach to opposite ends of a mixing bag 10 (see FIG. 7) filled with raw materials for the bread.

Behind the upper kneading drum 14 is a barcode reader 20 protruding inwardly from the rear wall of the oven compartment 2 that reads a barcode printed on the mixing bag 10. The barcode reader 20 is a pen type of barcode reader, and is moved across the barcode, thereby reading information represented by the barcode.

Figure 2A:
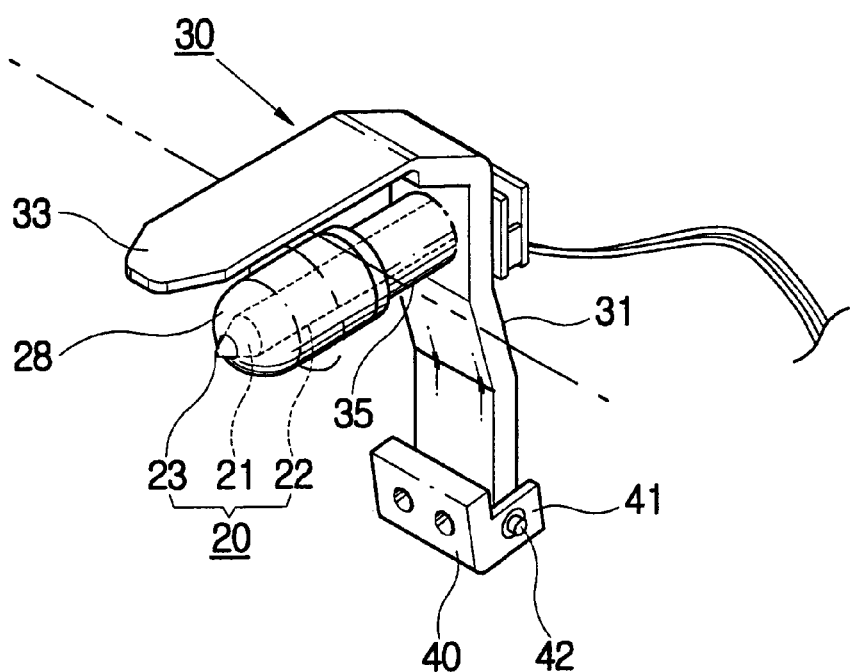
FIGS. 2A and 2B are perspective views of a combination of a barcode reader and a reader holder provided in the bread maker shown in FIG. 1.
Figure 2B:
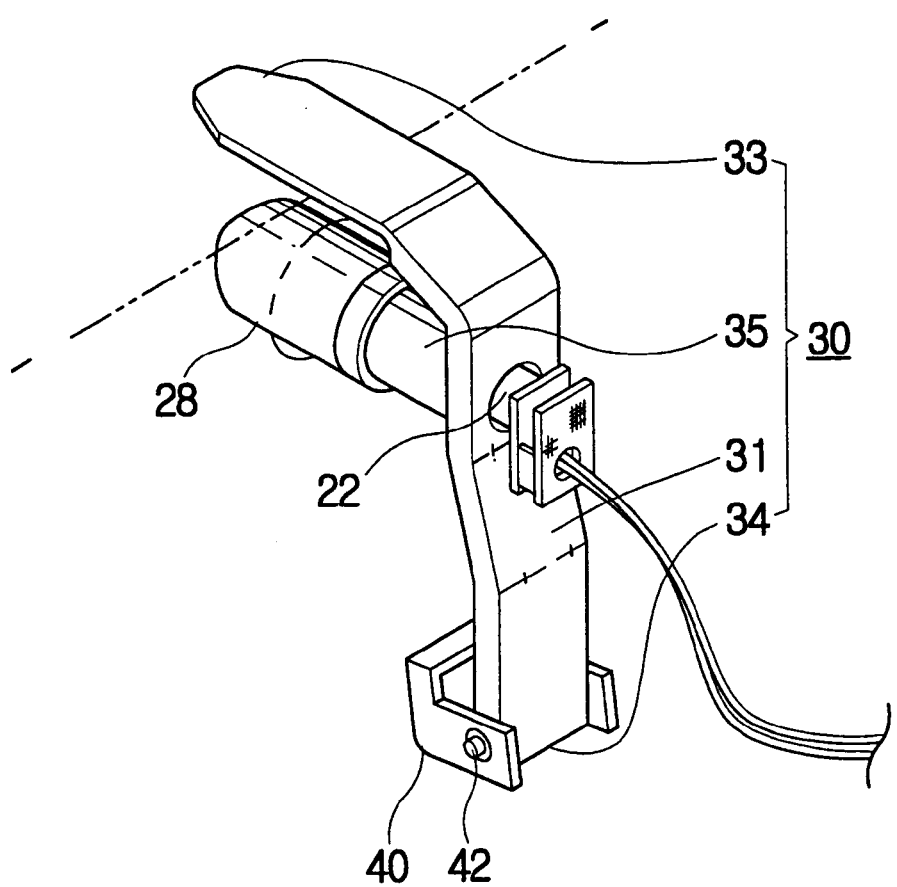

FIGS. 2A and 2B are perspective views of a combination of the barcode reader 20 and a reader holder 30 provided in the bread maker according to the embodiment of the present invention. As shown therein, the barcode reader 20 includes an optical sensor 21 for scanning the barcode, a sensor tip 23 at the tip of the optical sensor 21 that contacts the barcode at a point, and a sensor body 22 accommodating a part of the optical sensor 21 therein and supporting the optical sensor 21.

The reader holder 30 includes a holder body 31, a sensing lever 33 bent from one end of the holder body 31 that senses whether the door 3 is opened or closed, a hinge part 34 at the other end of the holder body 31 that is rotatably combined with a hinge supporting part 40, and a reader supporting part 35 that protrudes perpendicularly from the holder body 31 and supports the barcode reader 20.

The sensing lever 33 of the reader holder 30 is disposed above the reader supporting part 35 and moves forwards and backwards through a slot 4 formed in the main body 1 at a position where the main body 1 meets the door 3, thereby sensing whether the door 3 is opened or closed.

The reader supporting part 35 of the reader holder 30 allows a part of the sensor body 22 to pass therethrough.

Thus, the barcode reader 20 is supported by the reader supporting part 35 of the reader holder 30, and moves close to the upper kneading drum 14 when the door 3 is opened and distantly from the upper kneading drum 14 when the door 3 is closed. That is, the barcode reader 20 moves between a reading position and a releasing position as the door is opened and closed.

The hinge supporting part 40 is connected to the rear wall of the oven compartment 2, and has a pair of hinge arms 41 spaced apart from one another to accommodate the hinge part 34 of the reader holder 30. The hinge arms 41 and the hinge part 34 are combined using a hinge pin 42.

An extension spring 37 (see FIG. 3) elastically returns the barcode reader 20 from the releasing position, at which the barcode reader 20 is distant from the upper kneading drum 14, to the reading position, at which the barcode reader 20 is close to the upper kneading drum 14. The extension spring 37 has a first end coupled to the reader holder 30 above the hinge part 34, and a second end coupled to the hinge supporting part 40.

Further, the barcode reader 20 is covered with a guide cap 28 to smoothly guide the barcode printed on the mixing bag 10 to the sensor tip 23. The guide cap 28 is shaped like a cylinder having a convex surface at the front end, and the convex surface is formed with a tip hole 29 through which the sensor tip 23 juts out. The rear end of the guide cap 28 is opened and partially accommodates the barcode reader 20 and the reader supporting part 35 of the reader holder 30.

Figure 3:
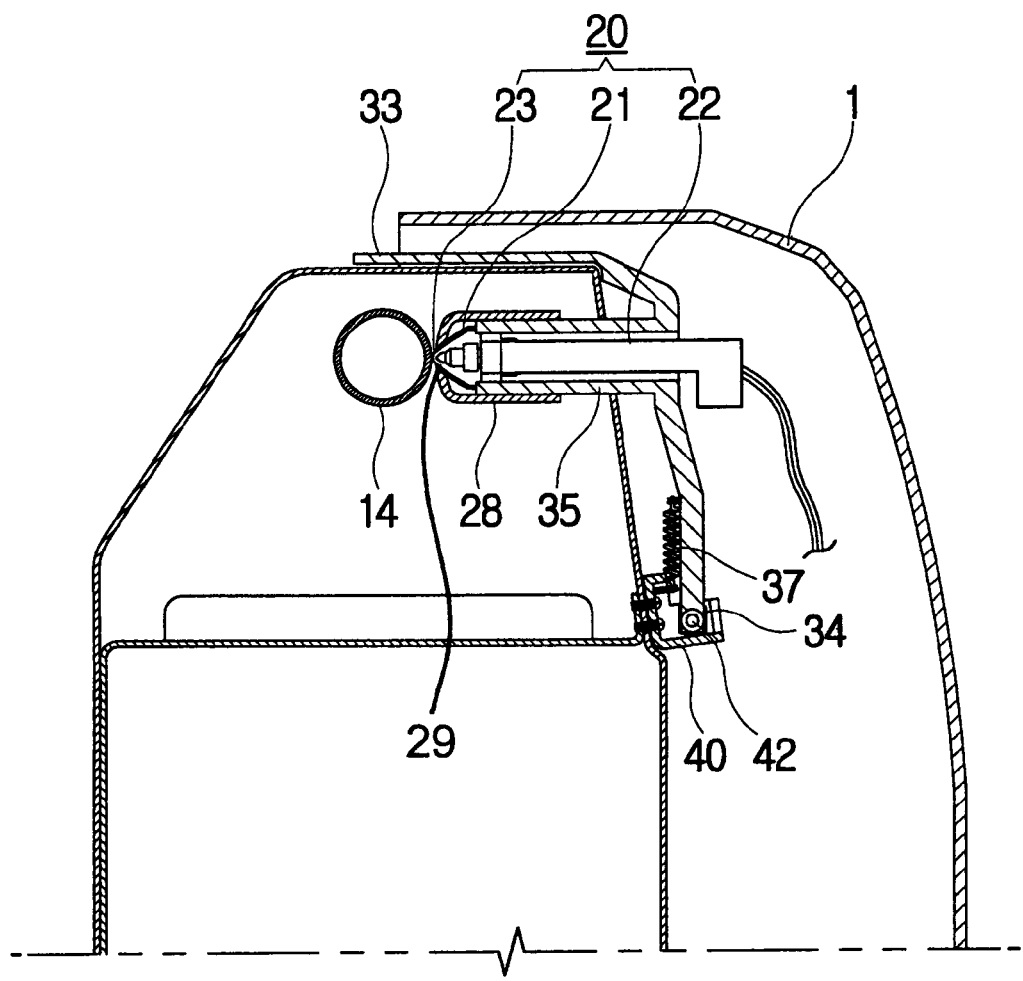
FIGS. 3 and 4 are side sectional views of the bread maker taken along line III—III in FIG. 1, illustrating operations of the barcode reader and the reader holder of FIGS. 2A and 2B.

FIG. 3 illustrates an operation of the barcode reader 20 and the barcode reader holder 30 when the door 3 is opened. As shown therein, the barcode reader 20 protrudes toward the inside of the oven compartment 2, and is close to the upper kneading drum 14. The sensing lever 33 of the reader holder 30 juts out by passing through the slot 4 formed in the main body 1 at a position where the main body 1 meets the door 3.

Figure 4:
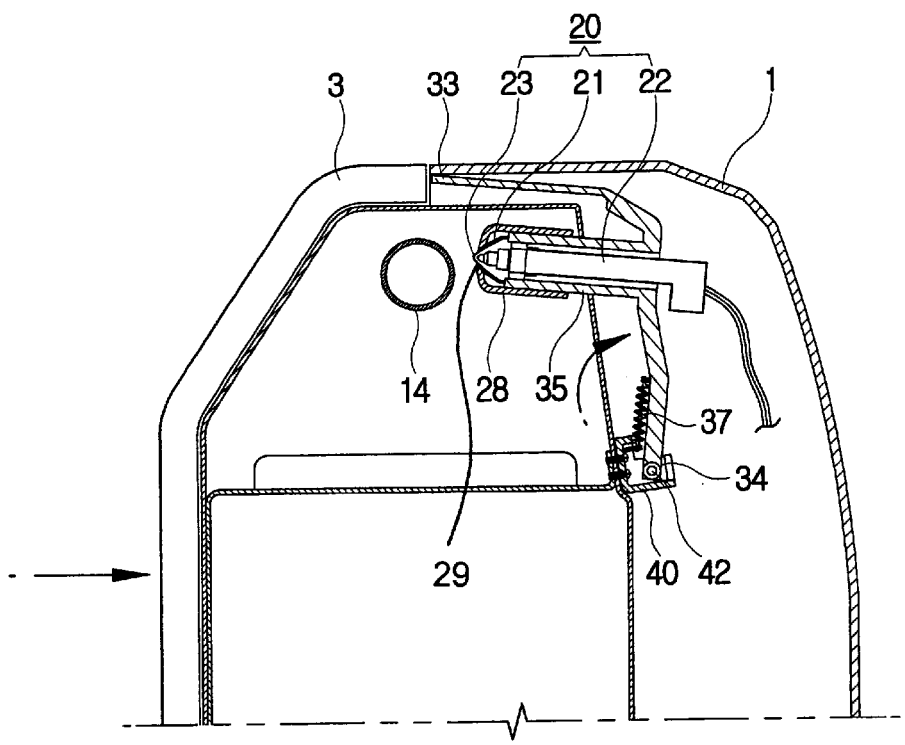
Figure 5:
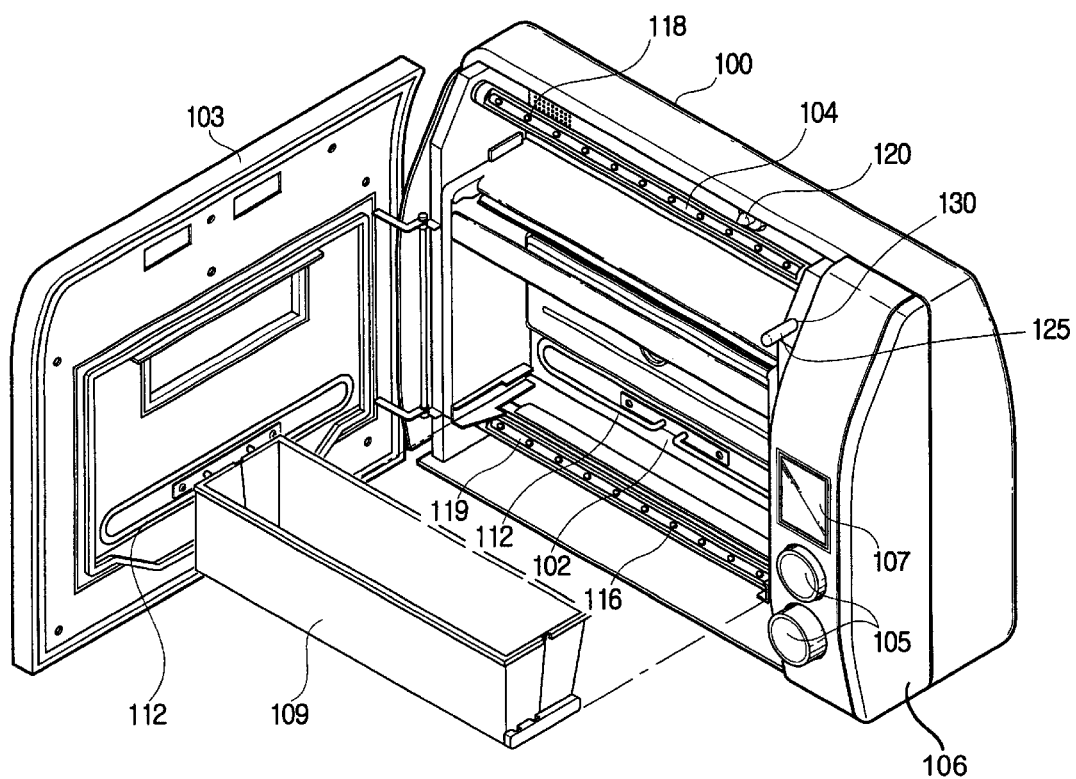
FIG. 5 is a perspective view of a conventional bread maker.
Figure 6:
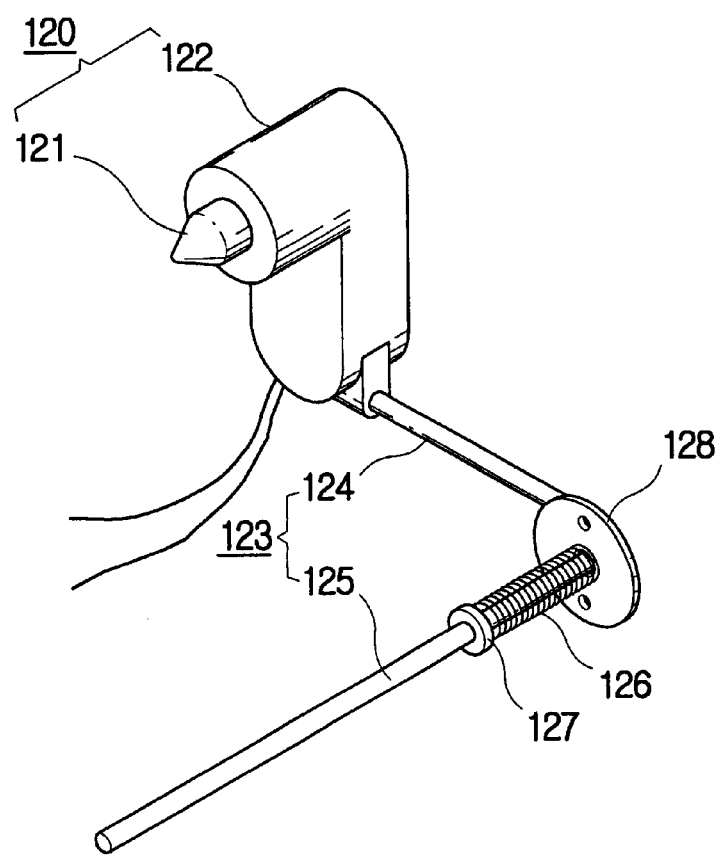
FIG. 6 is a perspective view of a barcode reader provided in the conventional bread maker of FIG. 5.

Oppositely, as shown in FIG. 4, when the door 3 is closed, the door 3 pushes the sensing lever 33 of the reader holder 30, which juts out from the main body 1 when the door 3 is opened. As the reader holder 30 moves backward, the reader supporting part 35 also moves backwards so that the barcode reader 20 supported by the reader supporting part 35 moves distantly from the upper kneading drum 14. At this time, the extension spring 37 coupled to the reader holder 30 is extended. However, when the door 3 is opened again, the elasticity of the extension spring 37 makes the barcode reader 20 move near the upper kneading drum 14.

The sensing lever 33 of the reader holder 30 senses whether the door is opened or closed without passing through the component compartment 6, and the spring 37 is located outside the oven compartment 2, so that the barcode reader 20 can smoothly move and scan the barcode without interference from the internal structure of the component compartment 6.

As described above, the present invention provides a bread maker in which a barcode reader can smoothly move and scan a barcode.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A bread maker having a main body forming an oven compartment, a door opening and closing the oven compartment, a pair of parallel kneading drums inside the oven compartment on which opposite ends of a mixing bag filled with bread ingredients are respectively attached, and a barcode reader to read a barcode printed on the mixing bag, the bread maker comprising:

a hinge supporting part attached to a rear wall of the oven compartment; and a reader holder inside the main body, including,
  a holder body,
  a sensing lever adjacent to one of the kneading drums and having one end connected to one end of the holder body and the other end protruding from the main body towards the door, the sensing lever being pushed back by the door when the door is closed and moving towards a front of the main body when the door is opened,
  a hinge part at the other end of the holder body and rotatably connected to the hinge supporting part, and
  a reader supporting part extending from the holder body towards the door and supporting the barcode reader,
wherein the barcode reader moves into a reading position near the adjacent kneading drum when the door is opened and moves into a releasing position distant from the adjacent kneading drum when the door is closed.

2. The bread maker according to claim 1, further comprising a spring member elastically pushing the reader holder toward the reading position.

3. The bread maker according to claim 2, wherein the spring member is an extension spring having a first end, distant from the hinge supporting part, coupled to the reader holder, and a second end coupled to the hinge supporting part.

4. The bread maker according to claim 1, wherein the hinge supporting part includes a hinge pin combined with the hinge part of the reader holder, and hinge arms rotatably supporting each end of the hinge pin.

5. The bread maker according to claim 1, wherein the barcode reader is a pen type of barcode reader.

6. The bread maker according to claim 1, wherein the barcode reader comprises:

an optical sensor to scan the barcode on the mixing bag;

a sensor tip at one end of the optical sensor to contact the barcode;

a sensor body accommodating a part of the optical sensor and supporting the optical sensor; and a guide cap covering the barcode reader to smoothly guide the barcode to the sensor tip.

7. The bread maker according to claim 2, wherein when the door is closed, thereby pushing back the sensing lever, the spring member extends, and when the door is opened, the extended spring member contracts to move the reader holder close to the adjacent kneading drum.

8. The bread maker according to claim 7, further comprising a component compartment accommodating a plurality of electric components, wherein the sensing lever moves forward and backward through a slot formed in the main body where the main body meets the door, without passing through the component compartment, to sense whether the door is opened or closed, and the spring member is located outside the oven compartment, the barcode reader thereby moving smoothly to scan the barcode without interference from an internal structure of the component compartment.

9. A barcode reader holder for a bread maker having a main body forming an oven compartment, a door opening and closing the oven compartment, a pair of parallel kneading drums inside the oven compartment on which opposite ends of a mixing bag filled with bread ingredients are respectively attached, and a barcode reader to read a barcode printed on the mixing bag, comprising:

a holder body;

a hinge supporting part attached to a rear wall of the oven compartment;

a sensing lever adjacent to one of the kneading drums and having one end connected to one end of the holder body and the other end protruding from the main body towards the door, the sensing lever being pushed back by the door when the door is closed and moving towards a front of the main body when the door is opened;

a hinge part combined with the other end of the holder body and rotatably connected to the hinge supporting part; and a reader supporting part extending from the holder body towards the door and supporting the barcode reader, wherein the barcode reader moves into a reading position near the adjacent kneading drum when the door is opened and moves into a releasing position distant from the adjacent kneading drum when the door is closed.

10. The barcode reader according to claim 9, further comprising an elastic member having a first end, distant from the hinge supporting part, coupled to the reader holder, and a second end coupled to the hinge supporting part, to elastically push the reader holder towards the reading position.

11. The barcode reader according to claim 9, wherein the hinge supporting part includes a hinge pin combined with the hinge part of the reader holder, and hinge arms rotatably supporting each end of the hinge pin.

12. The barcode reader according to claim 9, wherein the barcode reader is a pen type of barcode reader.

13. The barcode reader according to claim 9, wherein the barcode reader comprises:

an optical sensor to scan the barcode on the mixing bag;

a sensor tip at one end of the optical sensor to contact the barcode;

a sensor body accommodating a part of the optical sensor and supporting the optical sensor; and a guide cap covering the barcode reader to smoothly guide the barcode to the sensor tip.

14. The barcode reader according to claim 10, wherein when the door is closed, thereby pushing back the sensing lever, the elastic member extends, and when the door is opened, the extended elastic member contracts to move the reader holder close to the adjacent kneading drum.

15. The barcode reader according to claim 14, wherein the bread maker comprises a component compartment accommodating a plurality of electric components, the sensing lever moves forward and backward through a slot formed in the main body where the main body meets the door, without passing through the component compartment, to sense whether the door is opened or closed, and the elastic member is located outside the oven compartment, the barcode reader thereby moving smoothly to scan the barcode without interference from an internal structure of the component compartment.

16. A barcode reader assembly for a bread maker having a main body forming an oven compartment, a door opening and closing the oven compartment, a pair of parallel kneading drums inside the oven compartment on which opposite ends of a mixing bag filled with bread ingredients are respectively attached, and a barcode reader to read a barcode printed on the mixing bag, comprising:

a holder body;

a hinge supporting part attached to a rear wall of the oven compartment;

a sensing lever adjacent to one of the kneading drums and having one end connected to one end of the holder body and the other end protruding from the main body towards the door, the sensing lever being pushed back by the door when the door is closed and moving towards a front of the main body when the door is opened;

a hinge part combined with the other end of the holder body and rotatably connected to the hinge supporting part;

a reader supporting part extending from the holder body towards the door and supporting the barcode reader; and an elastic member having a first end coupled to the reader holder and a second end coupled to the hinge supporting part, the elastic member elastically pushing the reader holder towards the adjacent kneading drum when the door is opened, wherein the barcode reader moves into a reading position near the adjacent kneading drum when the door is opened and moves into a releasing position distant from the adjacent kneading drum when the door is closed.

17. The barcode reader assembly according to claim 16, wherein the hinge supporting part includes a hinge pin combined with the hinge part of the reader holder, and hinge arms rotatably supporting each end of the hinge pin.

18. The barcode reader assembly according to claim 16, wherein the barcode reader is a pen type of barcode reader.

19. The barcode reader assembly according to claim 16, wherein the barcode reader comprises:

an optical sensor to scan the barcode on the mixing bag;

a sensor tip at one end of the optical sensor to contact the barcode;

a sensor body accommodating a part of the optical sensor and supporting the optical sensor; and a guide cap covering the barcode reader to smoothly guide the barcode to the sensor tip.

20. The barcode reader assembly according to claim 16, wherein when the door is closed, thereby pushing back the sensing lever, the elastic member extends, and when the door is opened, the extended elastic member contracts to move the reader holder close to the adjacent kneading drum.

21. The barcode reader assembly according to claim 16, wherein the elastic member is a spring.

22. The barcode reader assembly according to claim 20, wherein the bread maker comprises a component compartment accommodating a plurality of electric components, the sensing lever moves forward and backward through a slot formed in the main body where the main body meets the door, without passing through the component compartment, to sense whether the door is opened or closed, and the elastic member is located outside the oven compartment, the barcode reader thereby moving smoothly to scan the barcode without interference from an internal structure of the component compartment.

* * * * *